(12) United States Patent
Alexander et al.

(10) Patent No.: US 10,102,002 B2
(45) Date of Patent: *Oct. 16, 2018

(54) DYNAMIC ISSUE MASKS FOR PROCESSOR HANG PREVENTION

(71) Applicant: International Business Machines Corporation, Armonk, NY (US)

(72) Inventors: Gregory W. Alexander, Pflugerville, TX (US); Steven R. Carlough, Poughkeepsie, NY (US); Lee E. Eisen, Roundrock, TX (US); David A. Schroter, Roundrock, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 418 days.

This patent is subject to a terminal disclaimer.

(21) Appl. No.: 14/501,176

(22) Filed: Sep. 30, 2014

(65) Prior Publication Data

US 2016/0092212 A1    Mar. 31, 2016

(51) Int. Cl.
*G06F 9/38* (2018.01)
*G06F 9/30* (2018.01)

(52) U.S. Cl.
CPC ........ *G06F 9/3838* (2013.01); *G06F 9/30145* (2013.01); *G06F 9/3836* (2013.01); *G06F 9/3859* (2013.01)

(58) Field of Classification Search
CPC .............................. G06F 9/3836; G06F 9/3861
See application file for complete search history.

(56) References Cited

U.S. PATENT DOCUMENTS

| | | | |
|---|---|---|---|
| 6,543,002 B1 | 4/2003 | Kahle et al. | |
| 6,981,129 B1 * | 12/2005 | Boggs | G06F 9/3842 712/218 |
| 7,000,047 B2 * | 2/2006 | Nguyen | G06F 9/3017 709/248 |
| 7,769,958 B2 | 8/2010 | Kinter et al. | |
| 8,171,448 B2 | 5/2012 | Johns et al. | |
| 8,200,946 B2 * | 6/2012 | Abernathy | G06F 9/30181 712/219 |

(Continued)

OTHER PUBLICATIONS

List of IBM patents or Patent Appliations Treated as Related—Date Filed: Sep. 1, 2015; 2 pages.

(Continued)

*Primary Examiner* — Jacob Petranek
(74) *Attorney, Agent, or Firm* — Cantor Colburn LLP; William A. Kinnaman, Jr.

(57) ABSTRACT

Embodiments include issuing dynamic issue masks for processor hang prevention. Aspects include storing an instruction in an issue queue for execution by an execution unit, the instruction including a default issue mask. Aspects further include determining whether the instruction in the issue queue is likely to be rescinded by the execution unit. Based on determining that the instruction is not likely to be rescinded by the execution unit, aspects include issuing the instruction to the execution unit with the default issue mask. Based on determining that the instruction is likely to be rescinded by the execution unit, aspects include issuing the instruction to the execution unit with a likely to be rescinded issue mask.

7 Claims, 6 Drawing Sheets

(56) References Cited

U.S. PATENT DOCUMENTS

| | | | | |
|---|---|---|---|---|
| 8,694,697 B1* | 4/2014 | Nuechterlein | .......... | G06F 13/14 |
| | | | | 710/20 |
| 2008/0320478 A1* | 12/2008 | Singh | .................... | G06F 9/3814 |
| | | | | 718/102 |
| 2009/0024838 A1* | 1/2009 | Dhodapkar | ........... | G06F 9/3836 |
| | | | | 712/214 |
| 2010/0058035 A1* | 3/2010 | Abernathy | ............ | G06F 9/3017 |
| | | | | 712/217 |
| 2010/0262808 A1* | 10/2010 | Bose | ..................... | G06F 9/3824 |
| | | | | 712/214 |
| 2010/0306505 A1* | 12/2010 | Williamson | .......... | G06F 9/3836 |
| | | | | 712/214 |
| 2012/0124586 A1* | 5/2012 | Hopper | ............... | G06F 9/30145 |
| | | | | 718/102 |
| 2013/0117541 A1* | 5/2013 | Choquette | ............. | G06F 9/3842 |
| | | | | 712/214 |
| 2015/0220345 A1* | 8/2015 | Corbal | .................. | G06F 1/3243 |
| | | | | 712/214 |

OTHER PUBLICATIONS

U.S. Appl. No. 14/841,796, filed Sep. 1, 2015; Entitled: "Dynamic Issue Masks for Processor Hang Preventions".

Hu et al., "Exploring Wakeup-Free Instruction Scheduling" In Software, IEEE Proceedings, IEEE, 2004; 10 pgs.

* cited by examiner

DYNAMIC ISSUE MASKS FOR PROCESSOR HANG PREVENTION

BACKGROUND

The present application relates generally to an improved data processing system and method. More specifically, the present application is directed to a system and method for issuing dynamic issue masks for processor hang prevention.

In modern processor design, especially in an out-of-order processor design, hang conditions such as livelocks are one of the most difficult problems to find and solve during a design phase, and are often not found until later when the design is implemented in hardware. A livelock condition can be described as a processor executing the same set of instructions repeatedly dYNAMIC without making any real progress. One of the causes of livelock conditions are repeated rescinding and re-issuing from an issue queue and never completing an instruction because of a repeated rescind condition occurring on a resource full or busy condition that is unable to be freed-up.

In general, a processor may implement multiple execution sub-units driven by a single issue port. In this case, if a long-running instruction is executing on one of these sub-units, it is desirable to be able to continue to issue instructions on that issue port. However, if the newly issued instruction conflicts with the currently executing instruction then the newly issued instruction may need to be rescinded and re-issued later. This can happen if the newly issued instruction is for the same execution sub-unit. Rescinding the newly issued instruction can result in a hang if an instruction is reissued and rescinded multiple times. In addition, the rescinding and re-issuing of instructions result in performance loss of the processor.

SUMMARY

Embodiments include a method for issuing dynamic issue masks for processor hang prevention. The method includes storing an instruction in an issue queue for execution by an execution unit, the instruction including a default issue mask. The method also includes determining whether the instruction in the issue queue is likely to be rescinded by the execution unit. Based on determining that the instruction is not likely to be rescinded by the execution unit, the method includes issuing the instruction to the execution unit with the default issue mask. Based on determining that the instruction is likely to be rescinded by the execution unit, the method includes issuing the instruction to the execution unit with a likely to be rescinded issue mask.

Embodiments include a computer system for issuing dynamic issue masks for processor hang prevention having a processor configured to perform a method. The method includes storing an instruction in an issue queue for execution by an execution unit, the instruction including an encoded issue mask. The method also includes determining whether the instruction in the issue queue is likely to be rescinded by the execution unit. Based on determining that the instruction is not likely to be rescinded by the execution unit, the method includes issuing the instruction to the execution unit with the default issue mask. Based on determining that the instruction is likely to be rescinded by the execution unit, the method includes issuing the instruction to the execution unit with a likely to be rescinded issue mask.

Embodiments also include a computer program product for issuing dynamic issue masks for processor hang prevention, the computer program product including a computer readable storage medium having computer readable program code embodied therewith. The computer readable program code including computer readable program code configured to perform a method. The method includes storing an instruction in an issue queue for execution by an execution unit, the instruction including a default issue mask. The method also includes determining whether the instruction in the issue queue is likely to be rescinded by the execution unit. Based on determining that the instruction is not likely to be rescinded by the execution unit, the method includes issuing the instruction to the execution unit with the default issue mask. Based on determining that the instruction is likely to be rescinded by the execution unit, the method includes issuing the instruction to the execution unit with a likely to be rescinded issue mask.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments include systems, methods and computer program products for issuing dynamic issue masks for processor hang prevention. In exemplary embodiments, a determination is made if an instruction in an issue queue is likely to be rescinded by an execution unit and if the instruction is likely to be rescinded the encoding of the issue mask for that instruction is modified. By modifying the encoding of the issue mask for an instruction that is likely to be rescinded, additional instructions that could conflict with the instruction are prevented from being issued, which in-turn prevents these instructions from being rescinded.

Figure 1:
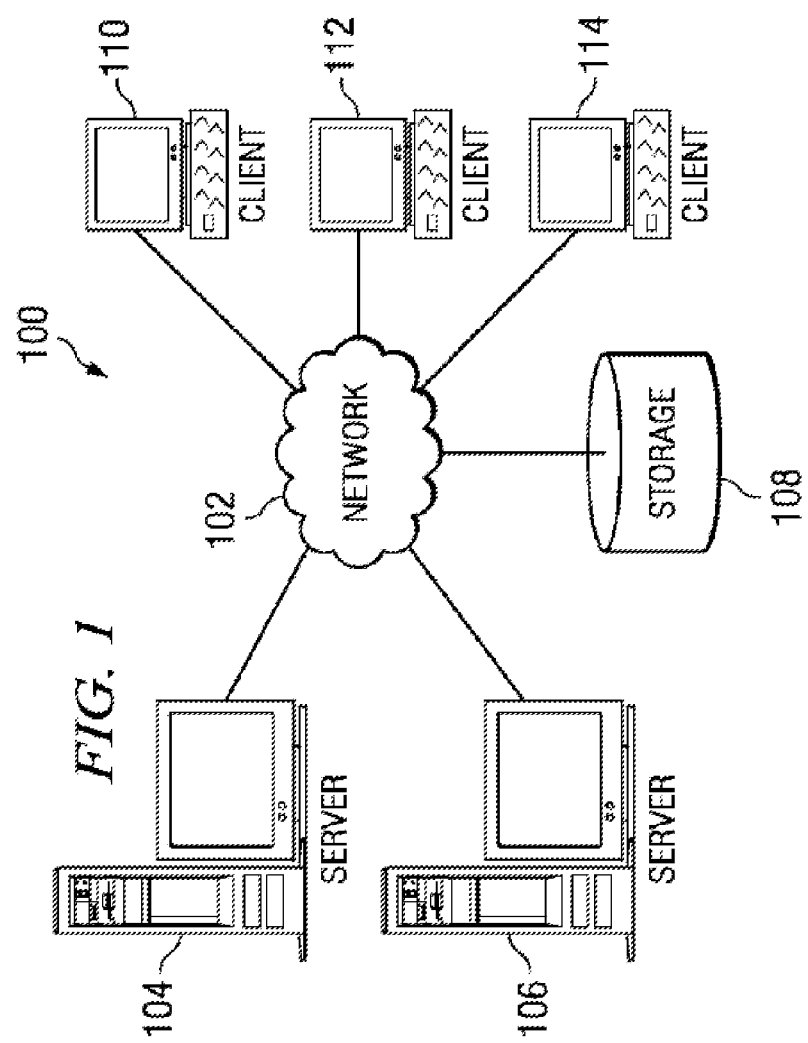
FIG. 1 is an exemplary diagram of a distributed data processing system in which aspects of the exemplary embodiments may be implemented.
Figure 2:
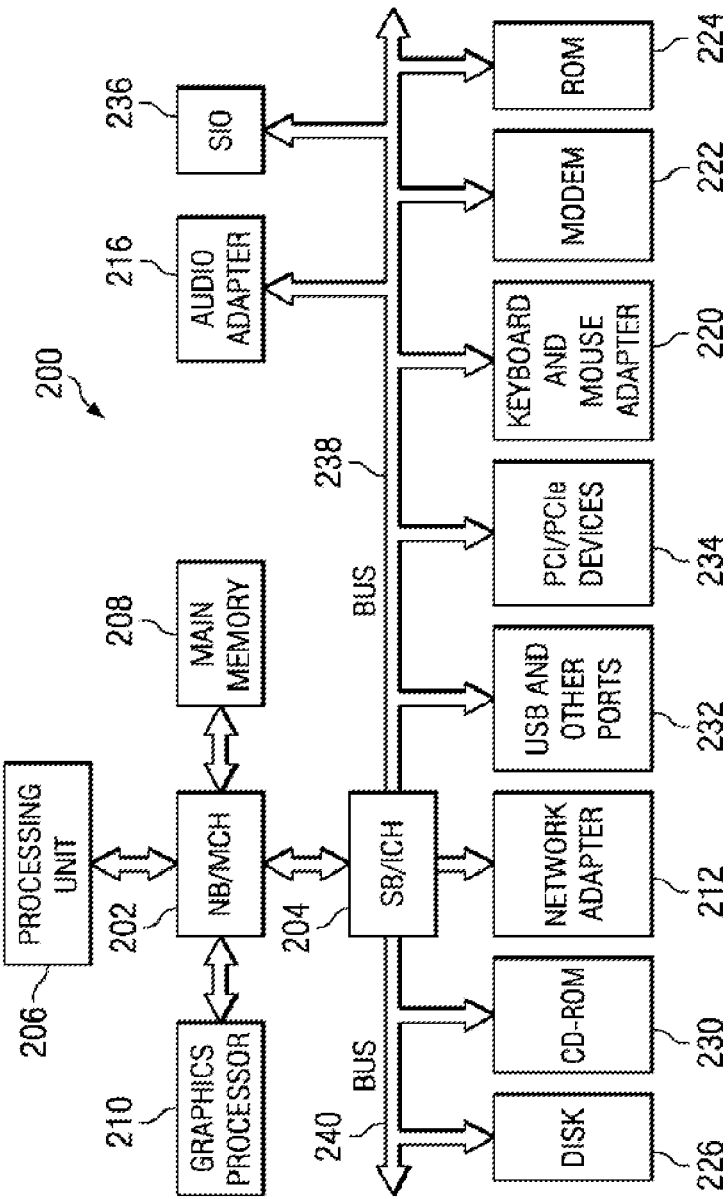
FIG. 2 is an exemplary block diagram of a data processing device in which aspects of the exemplary embodiments may be implemented.

The exemplary embodiments may be implemented in any processor of any computing device. For example, the exemplary embodiments may be used in any of a server computing device, client computing device, communication device, portable computing device, or the like. FIGS. 1-2 are provided hereafter as examples of a distributed data processing environment and computing devices in which exemplary aspects of the illustrative embodiments may be implemented. FIGS. 1-2 are only exemplary and are not intended to state or imply any limitation with regard to the types of computing devices in which the illustrative embodiments may be implemented. To the contrary, the exemplary embodiments may be implemented in any processor regardless of the particular machine or computing device in which the processor is ultimately operating.

With reference now to the figures, FIG. 1 depicts a pictorial representation of an exemplary distributed data processing system in which aspects of the illustrative embodiments may be implemented. Distributed data processing system 100 may include a network of computers in which embodiments of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the exemplary embodiments of the present invention may be implemented.

With reference now to FIG. 2, a block diagram of an exemplary data processing system is shown in which aspects of the exemplary embodiments may be implemented. Data processing system 200 is an example of a computer, such as server 104 or client 110 in FIG. 1, in which computer usable code or instructions implementing the processes for exemplary embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for exemplary embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the exemplary embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
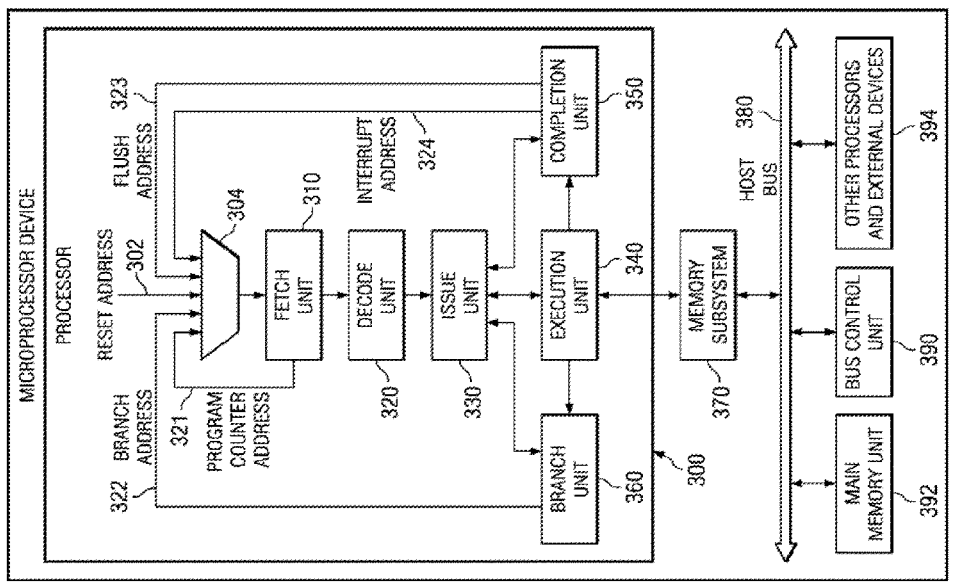
FIG. 3 is an exemplary diagram illustrating a pipeline of a processor in accordance with one exemplary embodiment.

FIG. 3 is an exemplary diagram illustrating a pipeline of a processor in accordance with one exemplary embodiment. As shown in FIG. 3, the processor 300 includes a processor pipeline comprised of a fetch address multiplexer 304, a fetch unit 310, decode unit 320, issue unit 330, execution unit 340, completion unit 350, and branch unit 360. The processor 300 is coupled to memory subsystem 370, host bus 380, bus control unit 390, main memory unit 392, and other processor and external devices 394, such as those depicted in FIG. 2, for example.

With the above arrangement of elements, typically, a hang condition can be described as the same set of instructions in a processor flow from fetch address multiplexer 304 to fetch unit 310, decode unit 320, issue unit 330, completion unit 350, and back to fetch address multiplexer 304 via the flush address path 323 over and over again multiple times without making any real progress by committing any instructions.

In exemplary embodiments, the decode unit 320 receives an instruction from a fetch unit 310 and encodes an issue mask for the instruction. In general, the issue mask is a set of bits that can be used to provide the issue unit 330 with an indication of the availability of an execution unit 340 after an instruction is issued to the execution unit 340. The issue mask can be used to identify both the number of and timing of cycles that the execution unit 340 will be unavailable after an instruction is issued to the execution unit 340. In one example, the issue mask may be a five bit field that contains bits that indicate that the execution unit 340 will be available or unavailable for each of the next five cycles after the instruction is sent to the execution unit 340. The length of the issue mask may vary depending on various factors, such as the type of execution unit.

In exemplary embodiments, the likely to be rescinded issue mask blocks an issuance of any further instructions to the issue unit for a predetermined number of cycles. In one example, a least restrictive issue mask of 0000 corresponds to issuing the instruction and then not blocking the issuance of additional instruction to the execution unit for the next four cycles. An issue mask of 0001 is slightly more restrictive and includes no early blocking of additional instruction to the execution unit, but includes blocking of additional instruction to the execution unit on the final cycle, perhaps for a register write. A most restrictive issue mask of 1111 corresponds to issuing the instruction and then blocking the issuance of additional instruction to the execution unit for the next four cycles.

Figure 4:
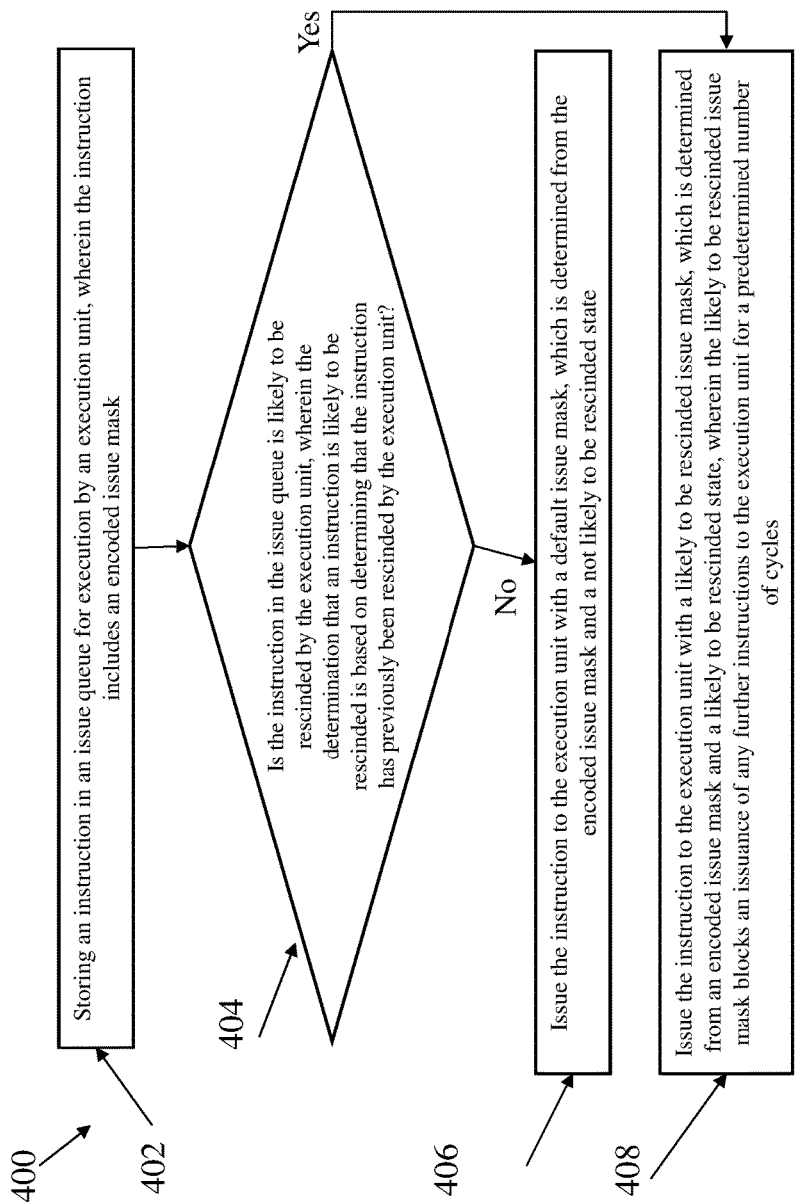
FIG. 4 illustrates a flow diagram of a method for dynamic issue masks for processor hang prevention in accordance with one embodiment.

Referring now to FIG. 4, a flow chart diagram of a method 400 for dynamic issue masks for processor hang prevention in accordance with an exemplary embodiment is shown. As shown at block 402, the method 400 includes storing an instruction in an issue queue for execution by an execution unit. In exemplary embodiments, the instruction includes an encoded issue mask. Next, as shown at decision block 404, the method 400 includes determining whether the instruction in the issue queue is likely to be rescinded by the execution unit. In exemplary embodiments, the determination of whether the instruction in the issue queue is likely to be rescinded by the execution unit includes checking a state bit in the issue queue that indicates whether the instruction is likely to be rescinded. If the instruction is not likely to be rescinded by the execution unit, the instruction is issued to the execution unit with a default issue mask, which is determined from the encoded issue mask and a not likely to be rescinded state, as shown at block 406. If the instruction is likely to be rescinded by the execution unit, the method 400 proceeds to block 408 and the instruction is issued to the execution unit with a likely to be rescinded issue mask, which is determined from an encoded issue mask and a likely to be rescinded state.

In one embodiment, the modification of the encoding of the issue mask may include replacing the default issue mask with a likely to be rescinded issue mask, where the likely to be rescinded issue mask is more restrictive that the default issue mask. For example, the likely to be rescinded issue mask may be configured to reflect that execution unit is not available during any of the cycles covered by the issue mask. In another embodiment, the modification of the encoding of the issue mask includes updating the default issue mask such that the availability of the execution unit after the issuance of the instruction is decreased. For example, by changing the availability of one or more cycles of the execution unit after the issuance of the instruction from available to unavailable.

In exemplary embodiments, the determination that an instruction is likely to be rescinded may be made based on determining that the instruction has previously been rescinded by the execution unit. In this embodiment, when an instruction is rescinded by the execution unit, a state bit in the issue queue is updated to indicate that the instruction has been previously rescinded and therefore indicates that the instruction is likely to be rescinded again. In other embodiments, the determination that an instruction is likely to be rescinded may be made by using a prediction table that can be accessed by either the decode unit or the issue unit.

In exemplary embodiments, an encoded issue mask is stored per instruction in an issue queue and a state bit is maintained for each instruction in the issue queue to identify if that instruction is likely to be rescinded or not. When the state bit indicates that the instruction is not likely to be rescinded, the issue mask is decoded to do a default level of blocking. However, when the state indicates that the instruction is likely to be rescinded, the issue mask is decoded to a more restrictive issue mask than the default issue mask.

In exemplary embodiments, the likely to be rescinded state bit for the instruction in the issue queue is set to true when that instruction is rescinded. In another embodiment, a prediction table is maintained, for example by the fetch unit, and is checked by the decode unit before the instruction is dispatched to the issue unit. When an instruction is rescinded, that entry in the table is updated to indicate that this instruction is likely to be rescinded, so that if that instruction is dispatched in the future, it will be marked as likely to be rescinded. It will be appreciated by those of ordinary skill in the art that there are number of ways to implement such a prediction table. In exemplary embodiments, if the prediction table indicates that the instruction is likely to be rescinded, then a likely to be rescinded state bit is set to true when the instruction is dispatched to the issue unit.

In exemplary embodiments, an instruction is issued to an execution unit with the state bit set to false, and thus the default issue mask will be used. Responsive to the instruction being rescinded, the state bit is set to true. Accordingly, when the instruction is issued again, since the state bit is true, the likely to be rescinded issue mask will be used.

Figure 5:
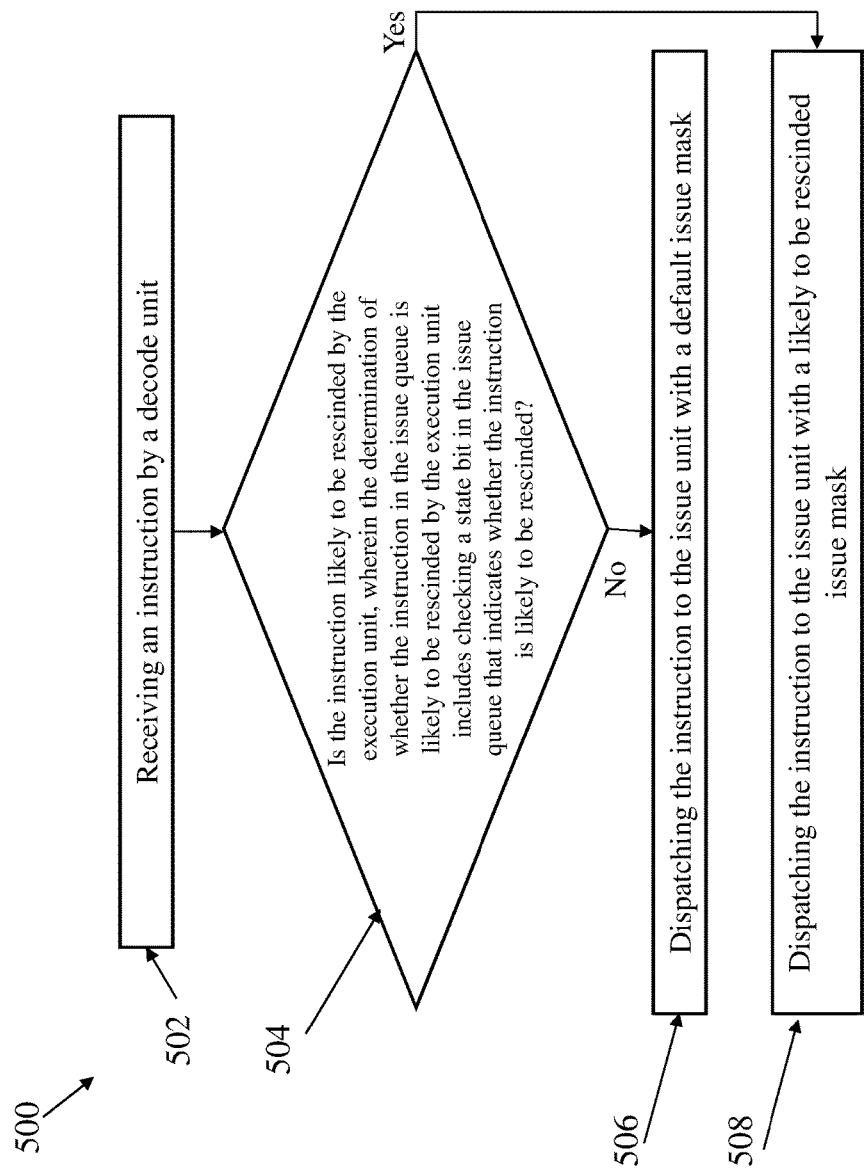
FIG. 5 illustrates a flow diagram of a method for dynamic issue masks for processor hang prevention in accordance with another embodiment.

Referring now to FIG. 5, a flow chart diagram of a method 500 for dynamic issue masks for processor hang prevention in accordance with an exemplary embodiment is shown. As shown at block 502, the method 500 includes receiving an instruction by a decode unit. Next, as shown at decision block 504, the method 500 includes determining whether the instruction is likely to be rescinded by an execution unit. In exemplary embodiments, the determination of whether the instruction is likely to be rescinded by the execution unit includes checking a prediction table. If the instruction is not likely to be rescinded by the execution unit, the instruction is dispatched to the issue unit with a default issue mask, as shown at block 506. If the instruction is likely to be rescinded by the execution unit, the method 500 proceeds to block 508 includes dispatching the instruction to the issue unit with a likely to be rescinded issue mask.

Figure 6:
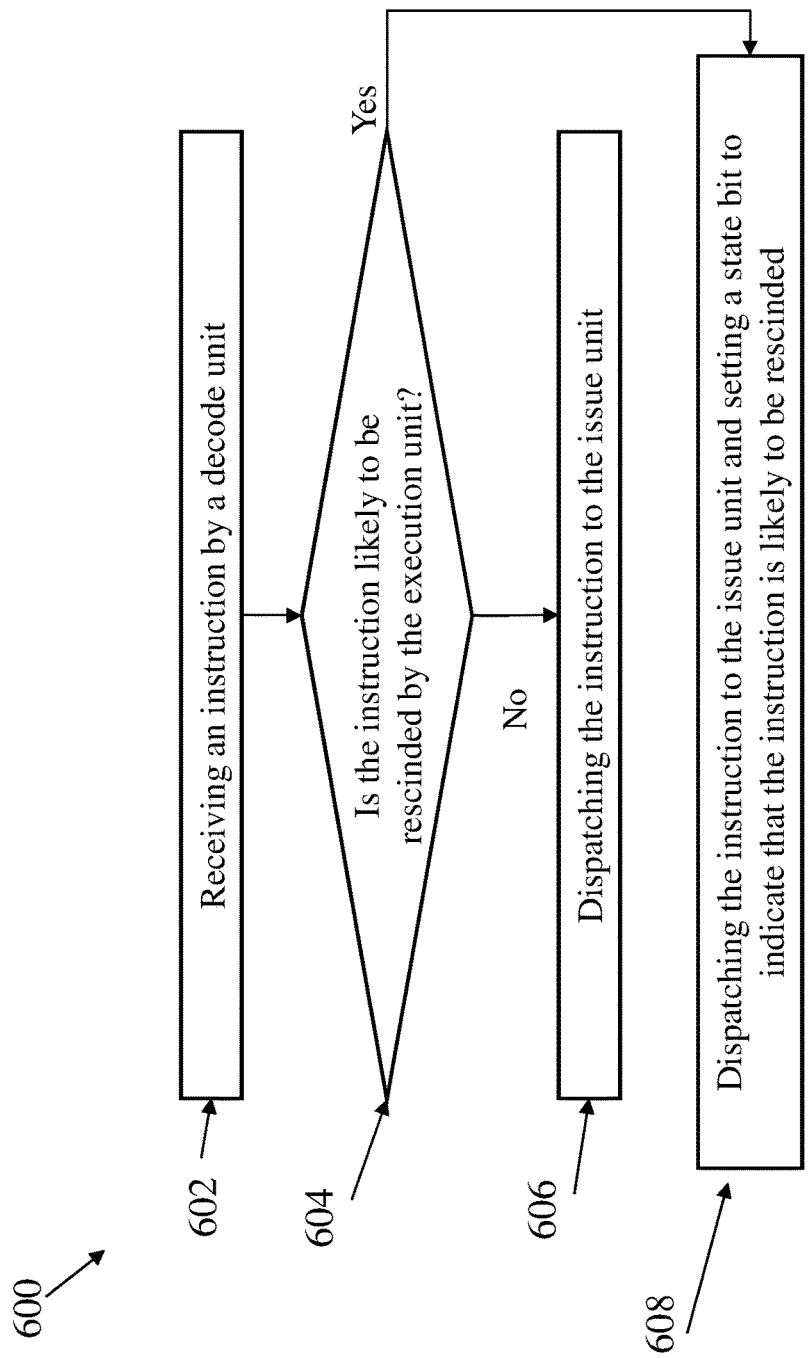
FIG. 6 illustrates a flow diagram of a method for dynamic issue masks for processor hang prevention in accordance with a further embodiment.

Referring now to FIG. 6, a flow chart diagram of a method 600 for dynamic issue masks for processor hang prevention in accordance with an exemplary embodiment is shown. As shown at block 602, the method 600 includes receiving an instruction by a decode unit. Next, as shown at decision block 604, the method 600 includes determining whether the instruction is likely to be rescinded by an execution unit. In exemplary embodiments, the determination of whether the instruction is likely to be rescinded by the execution unit includes checking a prediction table. If the instruction is not likely to be rescinded by the execution unit, the instruction is dispatched to the issue unit, as shown at block 606. If the instruction is likely to be rescinded by the execution unit, the method 600 proceeds to block 608 and includes dispatching the instruction to the issue unit and setting a state bit maintained by an issue queue to indicate that the instruction is likely to be rescinded.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A computer system for issuing dynamic issue masks for processor hang prevention, the computer system comprising:
    a processor configured to perform a method comprising:
        storing an instruction in an issue queue for execution by an execution unit;
        determining whether the instruction in the issue queue is likely to be rescinded by the execution unit;
        based on determining that the instruction is not likely to be rescinded by the execution unit, issuing the instruction to the execution unit with a default issue mask, wherein the default issue mask includes a default level of blocking;
        based on determining that the instruction is likely to be rescinded by the execution unit, issuing the instruction to the execution unit with a likely to be rescinded issue mask, wherein the likely to be rescinded issue mask includes a more restrictive level of blocking than the default level.

2. The computer system of claim 1, wherein the likely to be rescinded issue mask blocks an issuance of any further instructions to the execution unit for a predetermined number of cycles.

3. The computer system of claim 1, wherein the determination that an instruction is likely to be rescinded is based on determining that the instruction has previously been rescinded by the execution unit.

4. The computer system of claim 1, wherein the determination of whether the instruction in the issue queue is likely to be rescinded by the execution unit includes checking a state bit in the issue queue that indicates whether the instruction is likely to be rescinded.

5. The computer system of claim 4, wherein the state bit is set based on determining that an instruction has previously been rescinded by the execution unit.

6. The computer system of claim 4, wherein the state bit is set when the instruction is dispatched based on a prediction table.

7. A computer program product for issuing dynamic issue masks for processor hang prevention, the computer program product comprising:
    a computer readable storage medium having computer readable program code embodied therewith, the computer readable program code comprising:
    computer readable program code configured for:
        storing an instruction in an issue queue for execution by an execution;
        determining whether the instruction in the issue queue is likely to be rescinded by the execution unit;
        based on determining that the instruction is not likely to be rescinded by the execution unit, issuing the instruction to the execution unit with a default issue mask, wherein the default issue mask includes a default level of blocking;
        based on determining that the instruction is likely to be rescinded by the execution unit, issuing the instruction to the execution unit with a likely to be rescinded issue mask, wherein the likely to be rescinded issue mask includes a more restrictive level of blocking than the default level.

* * * * *